US008732620B2

(12) United States Patent
Lee et al.

(10) Patent No.: US 8,732,620 B2
(45) Date of Patent: May 20, 2014

(54) METHOD AND SYSTEM FOR A MORE REALISTIC INTERACTION EXPERIENCE USING A STEREOSCOPIC CURSOR

(75) Inventors: Hsin-Wei Lee, Shindian (TW); Yi-Chiun Hong, Danshui Township (TW)

(73) Assignee: Cyberlink Corp., Shindian, Taipei (TW)

( * ) Notice: Subject to any disclaimer, the term of this patent is extended or adjusted under 35 U.S.C. 154(b) by 143 days.

(21) Appl. No.: 13/478,525

(22) Filed: May 23, 2012

(65) Prior Publication Data

US 2013/0314315 A1 Nov. 28, 2013

(51) Int. Cl.
*G06F 3/048* (2013.01)

(52) U.S. Cl.
USPC .............................. 715/851; 345/156; 348/42

(58) Field of Classification Search
USPC .............. 345/156–184, 419–427; 348/42–60; 715/757, 851
See application file for complete search history.

(56) References Cited

U.S. PATENT DOCUMENTS

| | | | | |
|---|---|---|---|---|
| 5,784,052 | A | 7/1998 | Keyson | |
| 6,023,275 | A | 2/2000 | Horvitz et al. | |
| 6,084,589 | A | 7/2000 | Shima | |
| 6,166,718 | A | 12/2000 | Takeda | |
| 6,918,087 | B1 | 7/2005 | Gantt | |
| 7,178,111 | B2 | 2/2007 | Glein et al. | |
| 7,735,018 | B2 | 6/2010 | Bakhash | |
| 2002/0175911 | A1 | 11/2002 | Light et al. | |
| 2007/0279435 | A1 | 12/2007 | Ng et al. | |
| 2008/0010616 | A1 | 1/2008 | Algreatly | |
| 2008/0094398 | A1 | 4/2008 | Ng et al. | |
| 2008/0168399 | A1 | 7/2008 | Hetherington | |
| 2008/0186275 | A1 * | 8/2008 | Anderson | 345/157 |
| 2009/0079731 | A1 | 3/2009 | Fitzmaurice et al. | |

(Continued)

FOREIGN PATENT DOCUMENTS

| | | | |
|---|---|---|---|
| WO | 2007113828 | A2 | 10/2007 |
| WO | 2008048036 | A1 | 4/2008 |
| WO | 2009122214 | A2 | 10/2009 |

OTHER PUBLICATIONS

Azari et al., Sterio 3D Mouse Cursor: A Method for Interaction with 3D Objects in a Sterioscopic Virtual 3D Space, Hindawi Publishing Corporation, International Journal of Digital Multimedia Broadcasting, vol. 2010, Article ID 419493, 11 pages, Sep. 2009.

(Continued)

*Primary Examiner* — Liliana Cerullo
(74) *Attorney, Agent, or Firm* — McClure, Qualey & Rodack, LLP

(57) ABSTRACT

A stereoscopic cursor method comprising: calculating a cursor scene depth of a stereoscopic cursor for a stereoscopic user interface comprising plural stereoscopic buttons, wherein the stereoscopic cursor is positioned between a viewer and the plural stereoscopic buttons; constraining movement of the stereoscopic cursor between the viewer and the plural stereoscopic buttons at the cursor scene depth for input device movements by the viewer that navigate across the front of the plural stereoscopic buttons; receiving an input signal corresponding to viewer selection of one of the plural stereoscopic buttons; and responsive to receiving the input signal, causing movement of the stereoscopic cursor from one end of the cursor scene depth to the one of the plural stereoscopic buttons in a direction coincident with the cursor scene depth.

21 Claims, 6 Drawing Sheets

(56) References Cited

U.S. PATENT DOCUMENTS

| | | | | |
|---|---|---|---|---|
| 2009/0140978 | A1 | 6/2009 | Louch | |
| 2009/0201289 | A1 | 8/2009 | Kim et al. | |
| 2009/0217209 | A1 | 8/2009 | Chen et al. | |
| 2010/0033429 | A1 | 2/2010 | Olivan Bescos | |
| 2010/0037178 | A1 | 2/2010 | Queric | |
| 2010/0127983 | A1 | 5/2010 | Irani et al. | |
| 2011/0083106 | A1 * | 4/2011 | Hamagishi | 715/836 |
| 2011/0246877 | A1 * | 10/2011 | Kwak et al. | 715/702 |

OTHER PUBLICATIONS

N00bsify, How to get a Cursor Click effects NO DOWNLOADS!, http://www.youtube.com/watch?v=EYkKkPnO9SE, Aug. 2010.

Nguyen-Thong Dang, A Survey and Classification of 3D Pointing Techniques, Research, Innovation and Vision for the Future, 2007 IEEE International Conference, Mar. 2007.

grahamgrafx, 3D Cursor Environment, http://www.youtube.com/watch?v=HKD9f45ru3g&feature=related, Jan. 2010.

* cited by examiner

METHOD AND SYSTEM FOR A MORE REALISTIC INTERACTION EXPERIENCE USING A STEREOSCOPIC CURSOR

TECHNICAL FIELD

The present disclosure is generally related to stereoscopic technology, and, more particularly, is related to user interaction with stereoscopic multimedia systems.

BACKGROUND

Stereoscopic technology (e.g., 3D) and devices have gained increasing popularity among users. For instance, many multimedia entertainment systems implement stereoscopic user interfaces to immerse the user in a more realistic user experience. Some example user interface tools to facilitate this stereoscopic effect include a stereoscopic cursor in conjunction with a stereoscopic user interface presented on a display device. However, some possible shortcomings to the use of cursors in existing stereoscopic systems range from dizzying effects a user may experience as a result of movements of the cursor to visual effects where the cursor appears external to the stereoscopic experience.

SUMMARY

In one embodiment, a stereoscopic cursor method comprising: calculating a cursor scene depth of a stereoscopic cursor for a stereoscopic user interface comprising plural stereoscopic buttons, wherein the stereoscopic cursor is positioned between a viewer and the plural stereoscopic buttons; constraining movement of the stereoscopic cursor between the viewer and the plural stereoscopic buttons at the cursor scene depth for input device movements by the viewer that navigate across the front of the plural stereoscopic buttons; receiving an input signal corresponding to viewer selection of one of the plural stereoscopic buttons; and responsive to receiving the input signal, causing by a processor movement of the stereoscopic cursor from one end of the cursor scene depth to the one of the plural stereoscopic buttons in a direction coincident with the cursor scene depth.

In another embodiment, a stereoscopic cursor method, the method comprising: calculating a cursor scene depth of a stereoscopic cursor for a stereoscopic user interface comprising plural stereoscopic buttons, wherein the stereoscopic cursor is positioned between a viewer and the plural stereoscopic buttons; receiving an input signal corresponding to viewer selection of either a first of the plural stereoscopic buttons or a second of the plural stereoscopic buttons; if the viewer selects the first of the plural stereoscopic buttons, causing by a processor a first depth change movement of the stereoscopic cursor from one end of the cursor scene depth to a first surface of the first of the plural stereoscopic buttons; and if the viewer selects the second of the plural stereoscopic buttons, causing by the processor a second depth change movement of the stereoscopic cursor from the one end of the cursor scene depth to a second surface of the second of the plural stereoscopic buttons, the first depth change different than the second depth change.

In another embodiment, a stereoscopic cursor method, the method comprising: calculating a cursor scene depth of a stereoscopic cursor for a stereoscopic user interface comprising first and second stereoscopic buttons, wherein the stereoscopic cursor is positioned between a viewer and the first and second stereoscopic buttons, the first stereoscopic button comprising a scene depth that is different than the second stereoscopic button; constraining movement of the stereoscopic cursor between the viewer and the first and second stereoscopic buttons at the cursor scene depth for input device movements by the viewer that navigate across the front of the first and second stereoscopic buttons; receiving an input signal corresponding to viewer selection of one of the first and second stereoscopic buttons; and responsive to receiving the input signal, if the first stereoscopic button is selected, causing by a processor a first depth change movement of the stereoscopic cursor from one end of the cursor scene depth to a surface of the first stereoscopic button, otherwise causing by the processor a second depth change movement of the stereoscopic cursor from the one of the cursor scene depth to a surface of the second stereoscopic button.

In another embodiment, a stereoscopic cursor system, the system comprising: a memory comprising logic; and a processor configured by the logic to: calculate a cursor scene depth of a stereoscopic cursor for a stereoscopic user interface comprising plural stereoscopic buttons, wherein the stereoscopic cursor is positioned between a viewer and the plural stereoscopic buttons; constrain movement of the stereoscopic cursor between the viewer and the plural stereoscopic buttons at the cursor scene depth for input device movements by the viewer that navigate across the front of the plural stereoscopic buttons; receive an input signal corresponding to viewer selection of one of the plural stereoscopic buttons; and responsive to receiving the input signal, cause movement of the stereoscopic cursor from one end of the cursor scene depth to the one of the plural stereoscopic buttons in a direction coincident with the cursor scene depth.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
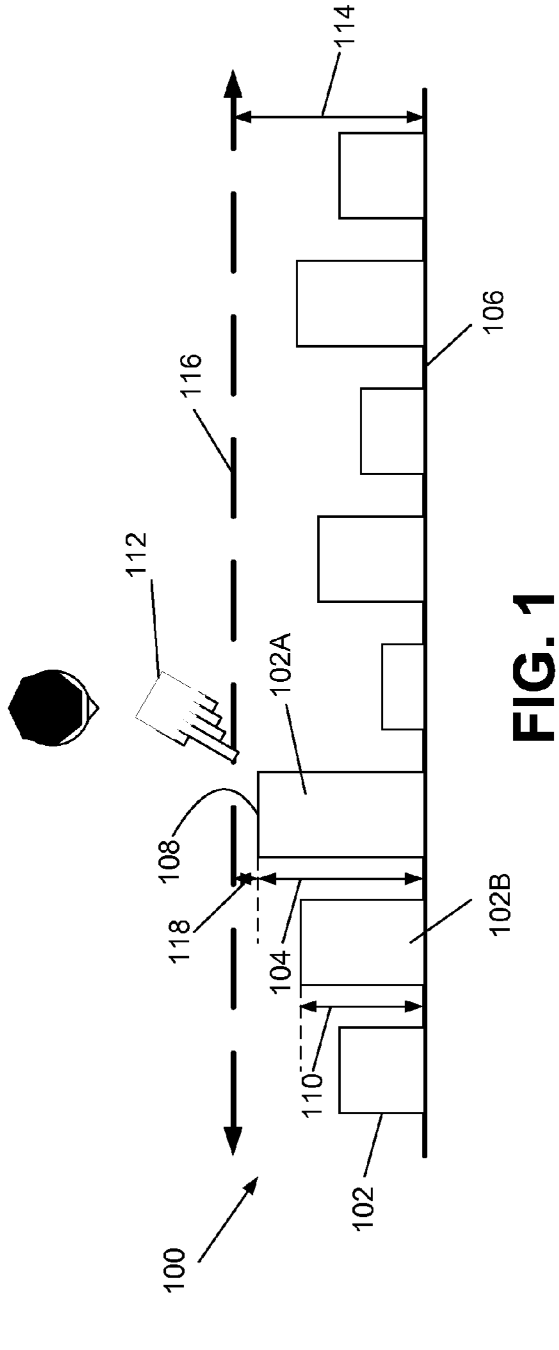
FIG. 1 is a schematic diagram depicting an example embodiment of a stereoscopic user interface environment with plural stereoscopic buttons and a fixed cursor scene depth.

Disclosed herein are certain embodiments of an invention that comprises a stereoscopic cursor system and method that enables a viewer to have a more realistic interaction experience when using a stereoscopic cursor in a stereoscopic user interface environment. In one embodiment, a stereoscopic cursor system calculates a cursor scene depth that is fixed as a stereoscopic cursor is navigated across (e.g., in front of, but not limited to that perspective) plural stereoscopic buttons that are presented in a stereoscopic user interface. There may be differences in scene depth among at least a portion of the stereoscopic buttons, resulting in a difference in depth change movement in an animation depicting selection of a selected one of the plural stereoscopic buttons by a viewer. In other words, in one embodiment, commencement of a selection movement of the stereoscopic cursor is always from one end of the cursor scene depth, and a depth change movement (e.g., from the one end of the cursor scene depth to a surface of one of the plural stereoscopic buttons) responsive to selection by a viewer of one of the plural stereoscopic buttons may be different than a depth change movement for another selected stereoscopic button having a difference scene depth. The depth change movement corresponds to a smooth movement.

In contrast, conventional systems have certain perceived shortcomings to scene depth changes as a result of cursor selection. For instance, where a cursor is always close to an object in the stereoscopic user interface (e.g., the object being, for instance, a stereoscopic button), the viewer may feel intense depth changes while moving between different stereoscopic objects. In other words, the viewer may experience dizziness or other uncomfortable feelings, such as nausea. On the other hand, should the cursor always be located on top of the stereoscopic objects, the viewer may not feel as if the cursor is part of the stereoscopic experience. By providing a fixed cursor scene depth during navigation and a realistic depth change movement, certain embodiments of a stereoscopic cursor system and method enable a viewer to feel more comfortable in what is perceived as a more realistic stereoscopic experience.

Having broadly summarized certain features of stereoscopic cursor systems and methods of the present disclosure, reference will now be made in detail to the description of the disclosure as illustrated in the drawings. While the disclosure is described in connection with these drawings, there is no intent to limit the disclosure to an embodiment or embodiments disclosed herein. For instance, though described using stereoscopic buttons in a stereoscopic user interface environment created in a computing device, it should be understood within the context of the present disclosure that other objects in the same or different displayed orientation may be presented in similar or different stereoscopic environments, and hence are contemplated to be within the scope of the disclosure. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is an example stereoscopic user interface 100 that is presented to a viewer (depicted by the head with dark hair located toward the top of FIG. 1), such as on a display screen of a computing system or device. The stereoscopic user interface 100 is shown in a plan view (e.g., overhead view). The stereoscopic user interface 100 may comprise plural stereoscopic objects, such as stereoscopic buttons 102. It should be appreciated that other virtual objects may be presented in the stereoscopic user interface 100. In the example depicted in FIG. 1, the stereoscopic buttons 102 each have a respective scene depth. For instance, for stereoscopic button 102A, the scene depth 104 is based on the distance between a base edge 106 common to all of the plural stereoscopic buttons 102 and a surface at an opposing end 108 of the stereoscopic button 102A. In one embodiment, the scene depths among all or at least a portion of the plural stereoscopic buttons 102 are different. For instance, the scene depth 104 for stereoscopic button 102A is different than the scene depth 110 of stereoscopic button 102B.

A computing system or device for generating the stereoscopic user interface 100 may have one or more sensors coupled thereto for detecting an input device, as is known. The input device may be a body part of a viewer, such as a hand or arm, or other input devices associated with a body part (e.g., held by a viewer's hand, such as a mouse, pointing device, etc.). The input device used herein for illustration is a viewer's hand, with the understanding that other input devices are contemplated to be within the scope of the disclosure. In the example stereoscopic user interface 100 depicted in FIG. 1, the viewer's hand is represented in virtual space as a stereoscopic cursor 112. Though shown as a "hand," the cursor 112 may be represented with other types of graphics or icons, such icons representing the input device in virtual space. A viewer may navigate the stereoscopic cursor 112 via hand movement in one or more directions to position for selection one of the plural stereoscopic buttons 102, the selection occurring in a direction that is different than the stereoscopic cursor movement prior to selection (e.g., orthogonal or transverse to the navigation movement, or in some embodiments, angled relative to the navigation movement). In one embodiment, the stereoscopic cursor 112 has a navigation movement that is constrained to a cursor scene depth 114, which is shown in FIG. 1 as the distance between dashed line 116 corresponding to the cursor scene depth 114 and the base edge 106 (herein, referred to also simply as base). The dashed line 116 may represent a virtual plane that constrains navigation movement. In some embodiments, the navigation movement may occur along the plane (dashed line 116) within a range corresponding to the height of the stereoscopic buttons 102, or at a fixed height in some embodiments. The cursor scene depth 114 is calculated in one embodiment by determining the scene depth 104 of largest value (e.g., the perceived "tallest" button 102A depicted in FIG. 1, which actually has greatest depth), and adding a predetermined depth value 118 to that greatest scene depth. In some embodiments, the predetermined depth value 118 is adjustable by a viewer to customize the viewer experience. In some embodiments, the predetermined depth value may be zero or a value greater than zero.

One result of a fixed cursor scene depth 114 is that a depth change movement (e.g., the distance or depth the stereoscopic cursor 112 moves beginning from line 116 and ending at a surface (facing the viewer) of each stereoscopic button 102, such as surface 108 in button 102A) varies depending on the selected stereoscopic button 102. Further, since navigational movement of the stereoscopic cursor 112 (e.g., across the front of the plural stereoscopic buttons 102 from the perspective of the viewer, the viewer located at an opposing side of the stereoscopic buttons 102 and separated from the buttons via line 116 as shown in FIG. 1) is constrained to the cursor scene depth 114, each depth change movement is different when each stereoscopic button 102 has a different scene depth (e.g., scene depth 104 versus scene depth 110). It should be appreciated that various arrangements of the stereoscopic buttons in the stereoscopic user interface 100 are contemplated, such as vertically, and hence not restricted to a linear arrangement along a horizontal axis.

Figure 3:
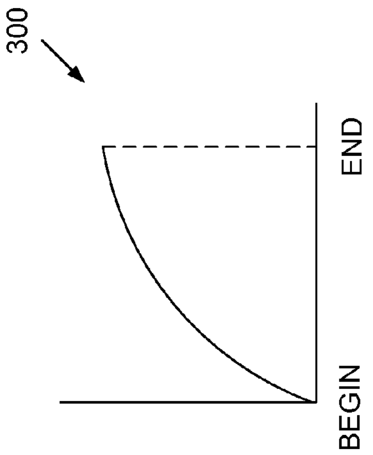
FIG. 3 is a schematic that illustrates an example smooth depth change movement curve.
Figure 2:
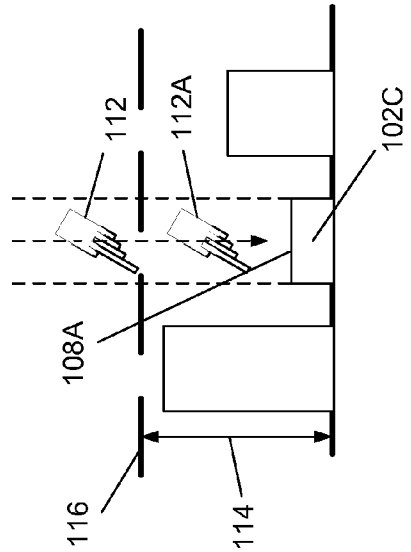
FIG. 2 is a schematic diagram that illustrates an embodiment of a process by which a user makes a selection to cause a depth change movement from one end of a calculated cursor scene depth to one of plural stereoscopic buttons in a portion of an embodiment of a stereoscopic user interface.

Referring to FIG. 2, an example depth change movement is illustrated for a portion of the plural stereoscopic buttons 102. In this example, the viewer is attempting to select the stereoscopic button 102C, and the cursor 112 moves from the cursor scene depth 114 (e.g., beginning from line 116) to a location proximal to a surface 108A of the button 102C, as denoted by stereoscopic cursor 112A. In other words, an embodiment of the stereoscopic cursor system provides an animation on the stereoscopic user interface 100 of the stereoscopic cursor 112 moving according to the depth change movement. The movement from beginning (line 116) to end (e.g., on or proximal to the surface 108A) is a smooth movement, as depicted in the example graph 300 of the depth change movement shown in FIG. 3.

Figure 4:
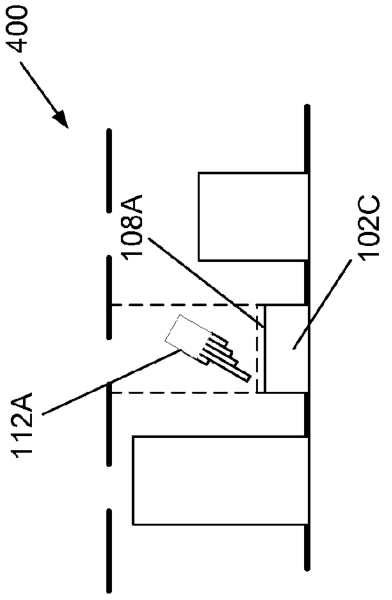
FIG. 4 is a schematic diagram that illustrates an embodiment of a press-button animation and movement of a stereoscopic cursor in relation to a selected stereoscopic button just prior to commencement of a press-button animation.
Figure 5:
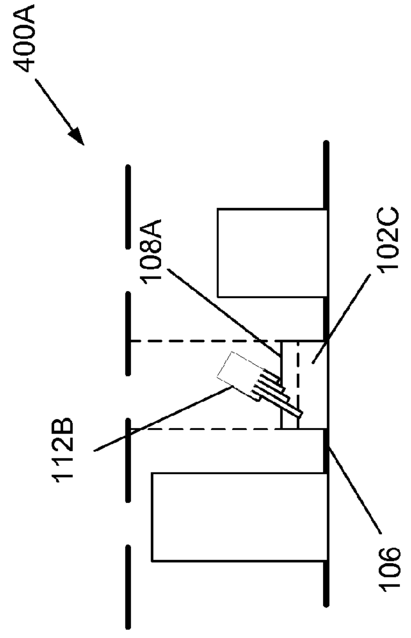
FIG. 5 is a schematic diagram that illustrates an embodiment of a press-button animation and a clicking effect between a stereoscopic cursor simultaneously with a selected stereoscopic button.
Figure 6:
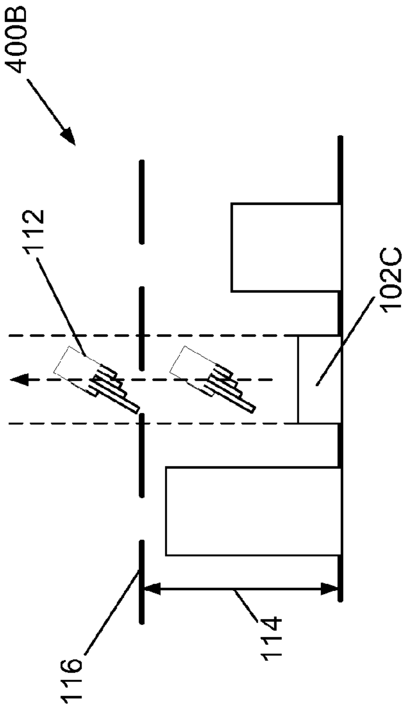
FIG. 6 is a schematic diagram that illustrates completion of an embodiment of a press-button animation and return of a stereoscopic cursor and released stereoscopic button to their pre-selected positions.

Referring to FIGS. 4-6, shown is a second stage of the viewer selection process for a representative one of the stereoscopic buttons 102, referred to herein also as a press-button animation. In some embodiments, the depth change movement and the press-button animation may comprise a single stage of operation. Referring to FIG. 4, the press-button animation 400 shows the stereoscopic cursor 112A proximal to (e.g., adjacent to, as denoted by the dashed, un-bolded line running parallel to, and adjacent to, the surface 108A) the surface 108A of the stereoscopic button 102C. Advancing the stereoscopic cursor 112A closer (now represented as stereoscopic button 112B in FIG. 5) to the stereoscopic button 102C in the press-button animation 400A shown in FIG. 5, a clicking animation is presented to the viewer. In other words, by the viewer "clicking" on the stereoscopic button 102C, the stereoscopic cursor 1128 appears to advance beyond the initial surface 108A of the stereoscopic button 102C and closer to the base 106. The clicking action or effect occurs between the stereoscopic cursor 112B and stereoscopic button 102C simultaneously. In some embodiments, the clicking effect appears as a change in appearance (e.g., change in shape, color, etc.) of the clicked stereoscopic button 102C, the stereoscopic cursor 112B, or a combination of both. In some embodiments, the clicking effect (e.g., the press-button animation) is presented in association with an audible sound (e.g., a clicking sound, etc.), with or without the aforementioned change in appearance. FIG. 6 shows completion of the press-button animation, designated as 400B, wherein the stereoscopic cursor 112 transitions back to its original (pre-selected or default) depth (e.g., back to the line 116 corresponding to the fixed cursor scene depth 114), as does the stereoscopic button 102C (e.g., back to its pre-selected position or depth) in embodiments where there is a change in the depth of the surface 108A during the clicking effect.

Figure 7:
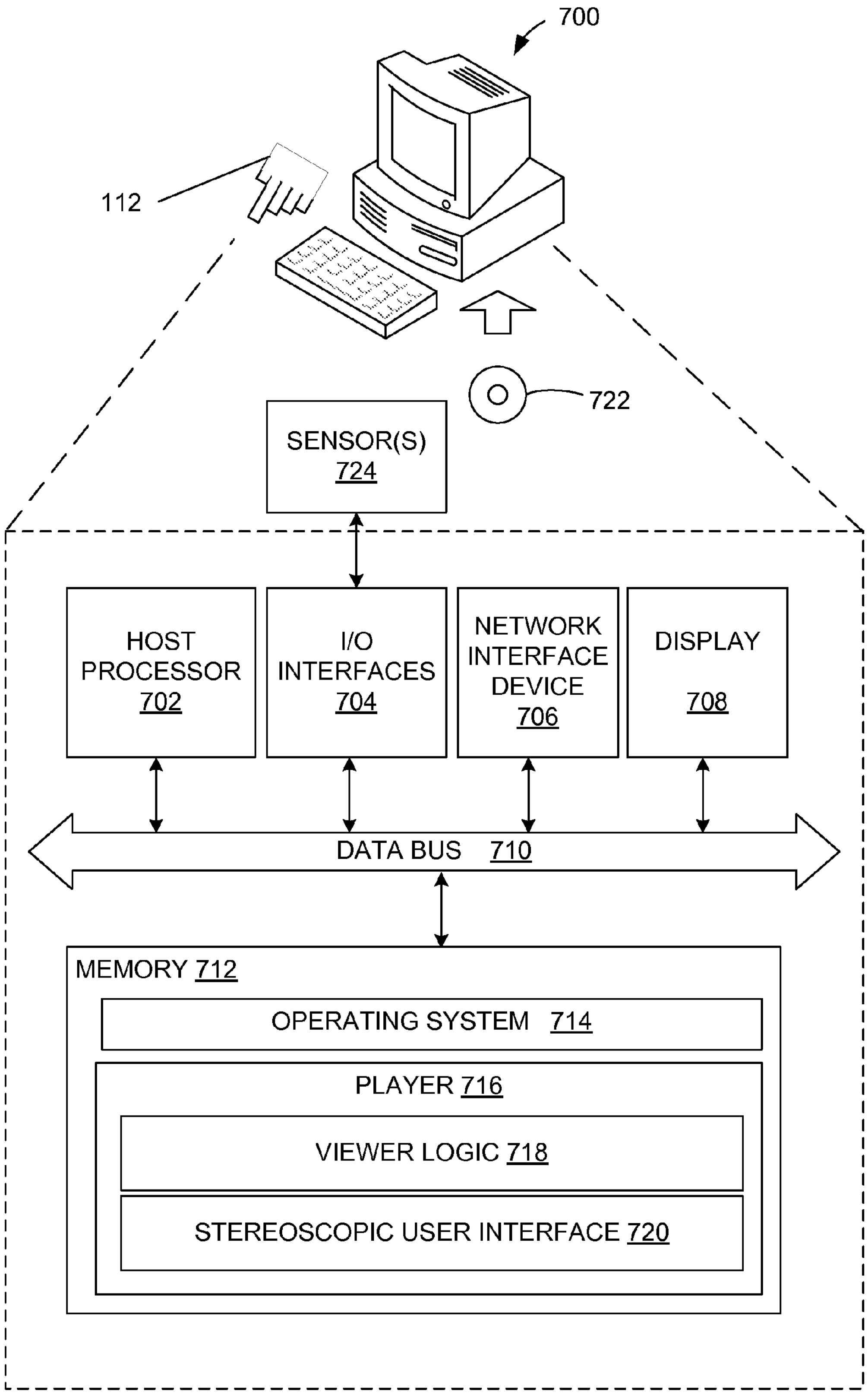
FIG. 7 is a block diagram of an example embodiment of a stereoscopic cursor system.

Having described an example operation of certain embodiments of a stereoscopic cursor system, attention is directed to FIG. 7, which illustrates an embodiment of a stereoscopic cursor system 700. The stereoscopic cursor system 700 may be embodied in the entirety of the system depicted in FIG. 7, or a subset thereof in some embodiments. The example stereoscopic cursor system 700 is shown as a computer (e.g., a computing system or device), though it should be appreciated within the context of the present disclosure that the stereoscopic cursor system 700 may comprise any one of a plurality of computing devices, including a dedicated player appliance, set-top box, laptop, computer workstation, cellular phone, personal digital assistant (PDA), handheld or pen based computer, embedded appliance, or other communication (wired or wireless) device that is coupled to, or integrated with, a disc drive (e.g., optical disc drive, magnetic disc drive, etc.) for enabling playback of multimedia content from a computer readable medium. In some embodiments, the stereoscopic cursor system 700 may be implemented on a network device located upstream of the system 700, such as a server, router, etc., or implemented with similar functionality distributed among plural devices (e.g., in a server device and the computing device). An upstream network device may be configured with similar components, and hence discussion of the same is omitted for brevity.

The stereoscopic cursor system 700 may, for instance, comprise one or more host processors, such as a host processor 702, one or more input/output interfaces 704 (I/O interfaces), a network interface device 706, and a display 708 connected across a data bus 710. The stereoscopic cursor system 700 may further comprise a memory 712 that includes an operating system 714 and application specific software (e.g., executable instructions or code), such as a player application 716 (or also, referred to herein as player logic or player). The player application 716 comprises, among other logic (e.g., software), viewer logic 718 and stereoscopic user interface logic 720. In some embodiments, the arrangement or grouping of software may be different (e.g., viewer logic 718 and/or stereoscopic user interface logic 720 may be separate from the player application 716). The viewer logic 718 may be implemented as a software program configured to read and play back content residing on a disc 722 (or from other high definition video sources) according to the specifications defined by standards such as the Blu-ray Disc format specification, HD-DVD, etc. In one example operation, once the disc 722 or other video source is received by the viewer logic 718, the viewer logic 718 can execute and/or render one or more user interactive programs residing on the disc 722.

An example user interactive program can include, but is not limited to, a movie introductory menu or other menus (in stereoscopic format, or converted thereto by conversion logic associated with, or embedded in, the player logic 716 or elsewhere), and user interactive features allowing a user to enhance, configure, and/or alter the viewing experience, choose playback configuration options, select chapters to view within the disc 722, in-movie user interactive features, games, or other features as should be appreciated by one having ordinary skill in the art in the context of the present disclosure. The stereoscopic user interface logic 720 is configured to generate a virtual environment, and present the stereoscopic user interface 100 representing the virtual environment on the display 708. Further, the stereoscopic user interface logic 720 is configured to receive movement information, such as detected by one or more sensors 724 coupled to, or in some embodiments integrated with, the computing device via the I/O interfaces 704. The sensing or detecting by the sensors 724 of hand movement (or movement of other input devices) may be implemented using any one or variety of known sensing techniques, including ultrasound, infrared, etc. The stereoscopic user interface logic 720 is configured to represent the input device (e.g., the viewer's hand, though other input devices are contemplated such as a keyboard, pointing device, etc.) as the stereoscopic cursor 112 for presentation in the stereoscopic user interface 100. The stereoscopic user interface logic 720 is further configured with logic to calculate the various scene depths (e.g., button scene depth, cursor scene depth), which includes making a determination of the largest scene depth and incorporating a predetermined depth value for determination of the cursor scene depth. Further, the stereoscopic user interface logic 720 is configured to present various animation effects in the stereoscopic user interface environment 100, such as depth change movements, press-button animation, etc. Note that the player logic 716 may also be implemented, in whole or in part, as a software program residing in mass storage, the disc 722, a network location, or other locations, as should be appreciated by one having ordinary skill in the art.

The host processor 702 may include any custom made or commercially available processor, a central processing unit (CPU) or an auxiliary processor among several processors associated with the stereoscopic cursor system 700, a semiconductor based microprocessor (in the form of a microchip), one or more ASICs, a plurality of suitably configured digital logic gates, and/or other well-known electrical configurations comprising discrete elements both individually and in various combinations to coordinate the overall operation of the computing system.

The memory 712 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 712 typically comprises the native operating system 714, one or more native applications, emulation systems, or emulated applications for any of a variety of operating systems and/or emulated hardware platforms, emulated operating systems, etc. For example, the applications may include application specific software stored on a computer readable medium for execution by the host processor 702 and may include the player application 716 and its corresponding constituent components (e.g., 718, 720). One of ordinary skill in the art will appreciate that the memory 712 may, and typically will, comprise other components which have been omitted for purposes of brevity.

Input/output interfaces 704 provide any number of interfaces for the input and output of data. For example, where the stereoscopic cursor system 700 comprises a personal computer, these components may interface with a user input device, which may be a body part of a viewer (e.g., hand, arm, etc.), keyboard, a mouse, or voice activated mechanism. Where the stereoscopic cursor system 700 comprises a handheld device (e.g., PDA, mobile telephone), these components may interface with function keys or buttons, a touch sensitive screen, a stylus, body part, etc. The input/output interfaces 704 may further include one or more disc drives (e.g., optical disc drives, magnetic disc drives) to enable playback of multimedia content residing on the computer readable medium 722, and as explained above, may interface with the sensor(s) 724.

The network interface device 706 comprises various components used to transmit and/or receive data over a network environment. By way of example, the network interface device 706 may include a device that can communicate with both inputs and outputs, for instance, a modulator/demodulator (e.g., a modem), wireless (e.g., radio frequency (RF)) transceiver, a telephonic interface, a bridge, a router, network card, etc. The stereoscopic cursor system 700 may further comprise mass storage. For some embodiments, the mass storage may include a data structure (e.g., database) to store and manage data. Such data may comprise, for example, editing files which specify special effects for a particular movie title.

The display 708 may comprise a computer monitor or a plasma screen for a PC or a liquid crystal display (LCD) on a hand held device, for example. In some embodiments, the display 708 may be separate from the stereoscopic cursor system 700, and in some embodiments, integrated in the computing device. In one embodiment, the display 708 comprises a screen on which the environment 100 or a portion thereof is presented.

In the context of this disclosure, a "computer-readable medium" stores one or more programs and data for use by or in connection with the instruction execution system, apparatus, or device. The computer readable medium is non-transitory, and may be, for example, but not limited to, an electronic, magnetic, optical, electromagnetic, infrared, or semiconductor system, apparatus, or device. More specific examples (a non-exhaustive list) of the computer-readable medium may include, in addition to those set forth above, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

Figure 8:
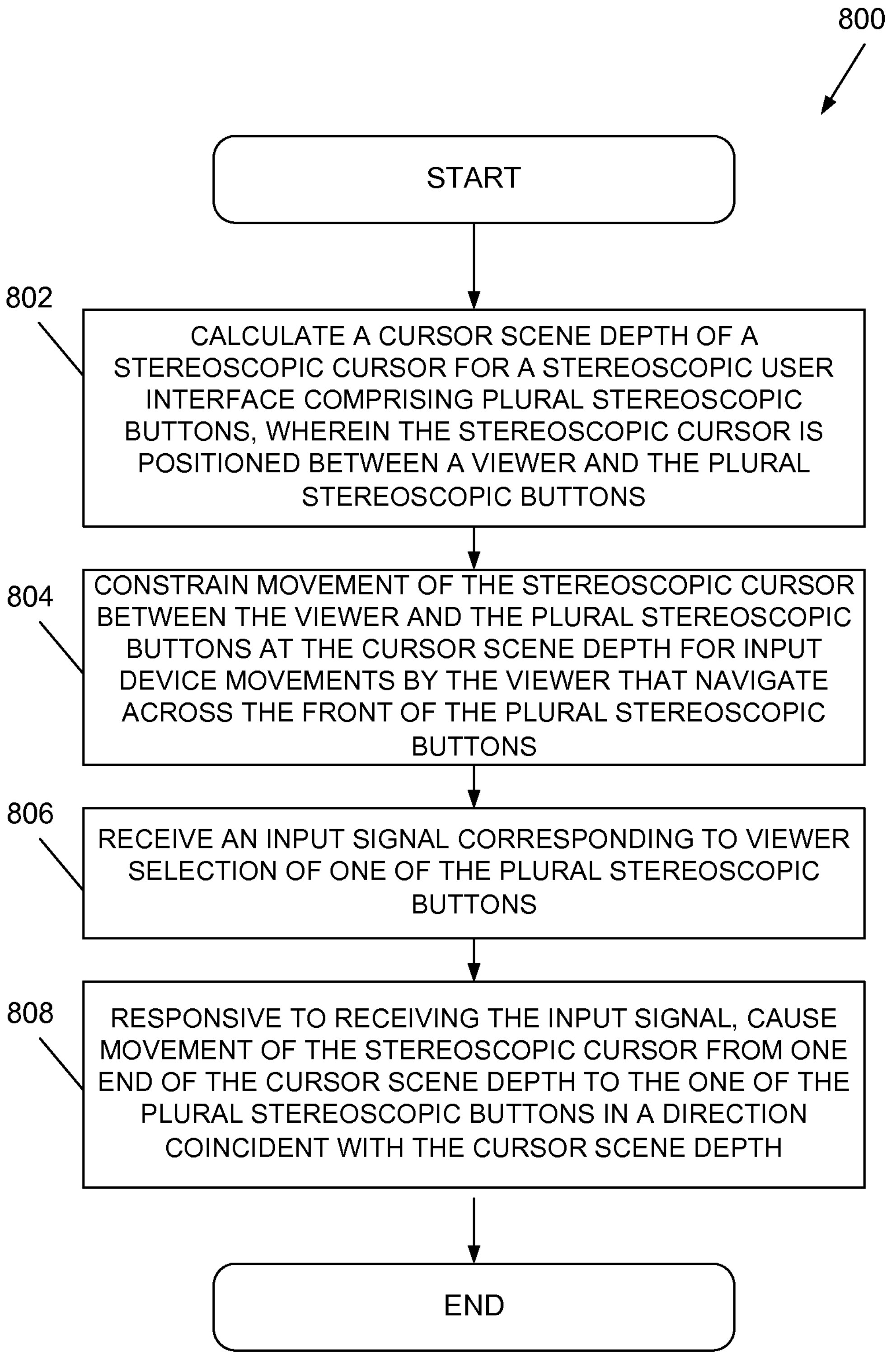
FIG. 8 is a flow diagram of an example embodiment of a stereoscopic cursor method.

Having provided a detailed description of certain embodiments of stereoscopic cursor systems and methods, it should be appreciated that one embodiment of a stereoscopic cursor method 800, implemented by the stereoscopic cursor system 700 and depicted in FIG. 8, comprises calculating a cursor scene depth of a stereoscopic cursor for a stereoscopic user interface comprising plural stereoscopic buttons, wherein the stereoscopic cursor is positioned between a viewer and the plural stereoscopic buttons (802). As explained above, the cursor scene depth may be calculated based on the computed scene depth of the stereoscopic button having the largest depth and a predetermined value added the scene depth. The method 800 further comprises constraining movement of the stereoscopic cursor between the viewer and the plural stereoscopic buttons at the cursor scene depth for input device movements by the viewer that navigate across the front of the plural stereoscopic buttons (804). For instance, as illustrated in FIG. 1, non-selecting movement may be constrained along line (e.g., plane) 116. The method 800 further comprises receiving an input signal corresponding to viewer selection of one of the plural stereoscopic buttons (806), and responsive to receiving the input signal, causing movement of the stereoscopic cursor from one end of the cursor scene depth to the one of the plural stereoscopic buttons in a direction coincident with the cursor scene depth (808). As shown in FIG. 1, in one embodiment, one end of the cursor scene depth 114 comprises the line 116.

Figure 9:
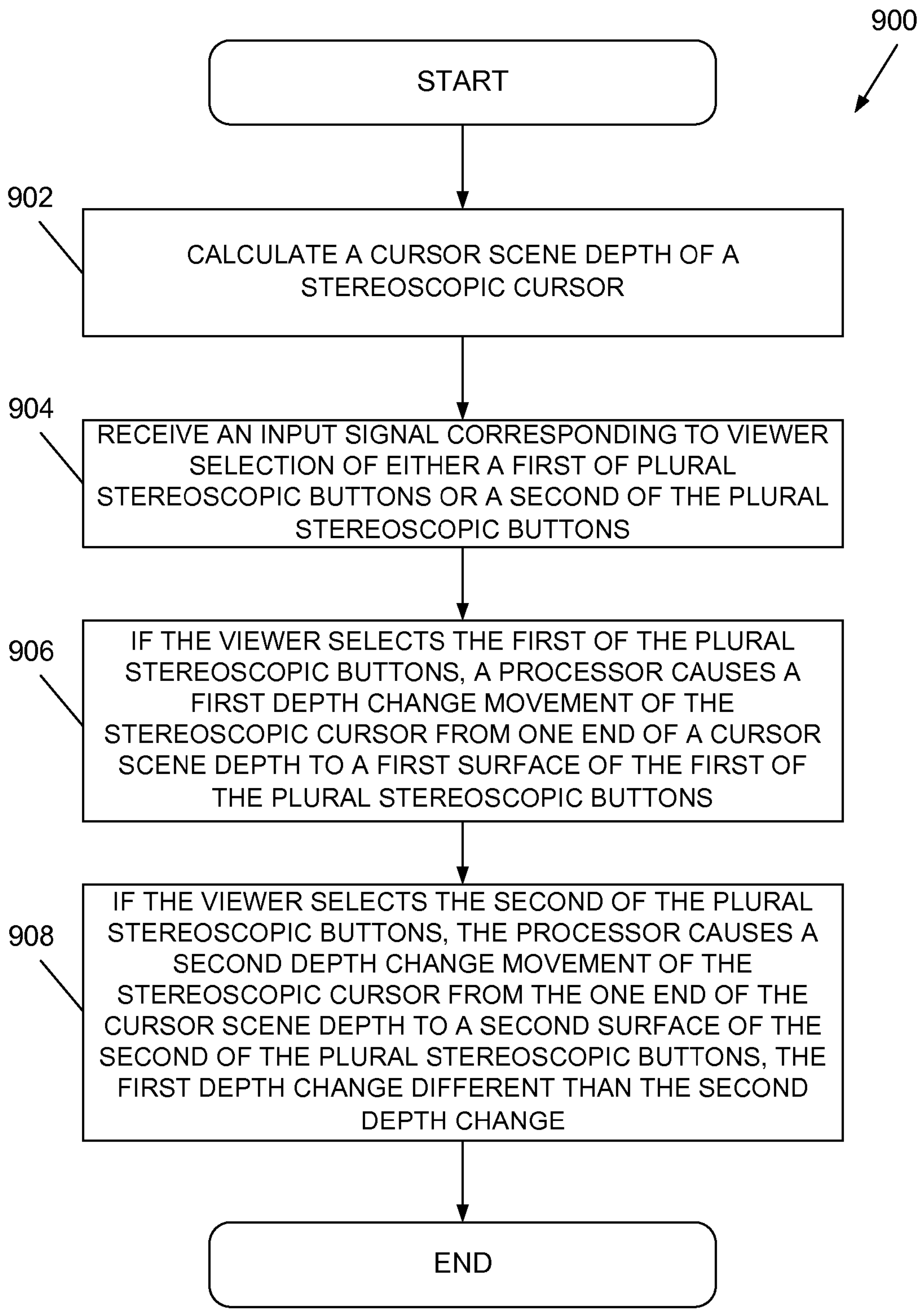
FIG. 9 is a flow diagram of another example embodiment of a stereoscopic cursor method.

In view of the foregoing disclosure, it should be appreciated that another embodiment of a stereoscopic cursor method 900, implemented by the stereoscopic cursor system 700 and depicted in FIG. 9, comprises calculating a cursor scene depth of a stereoscopic cursor (902). The stereoscopic cursor may be present in a stereoscopic user interface comprising plural stereoscopic buttons, wherein the stereoscopic cursor is positioned between a viewer and the plural stereoscopic buttons. The method 900 further comprises receiving an input signal corresponding to viewer selection of either a first of the plural stereoscopic buttons or a second of the plural stereoscopic buttons (904). In other words, the viewer is presented with a selection of plural stereoscopic buttons, at least a portion of which have different scene depths. The method 900 further comprises performing certain processing depending on the action of the viewer. For instance, if the viewer selects the first of the plural stereoscopic buttons, a processor causes a first depth change movement of the stereoscopic cursor from one end of the cursor scene depth to a first surface of the first of the plural stereoscopic buttons (906). If the viewer selects the second of the plural stereoscopic buttons, the processor causes a second depth change movement of the stereoscopic cursor from the one end of the cursor scene depth to a second surface of the second of the plural stereoscopic buttons, the first depth change different than the second depth change (908). As explained above, the depth change movement associated with two different stereoscopic buttons of different scene depths gives rise to different depth change movements. In some embodiments, receiving the input signal is based on either a click event, touch event, or gesture event.

Figure 10:
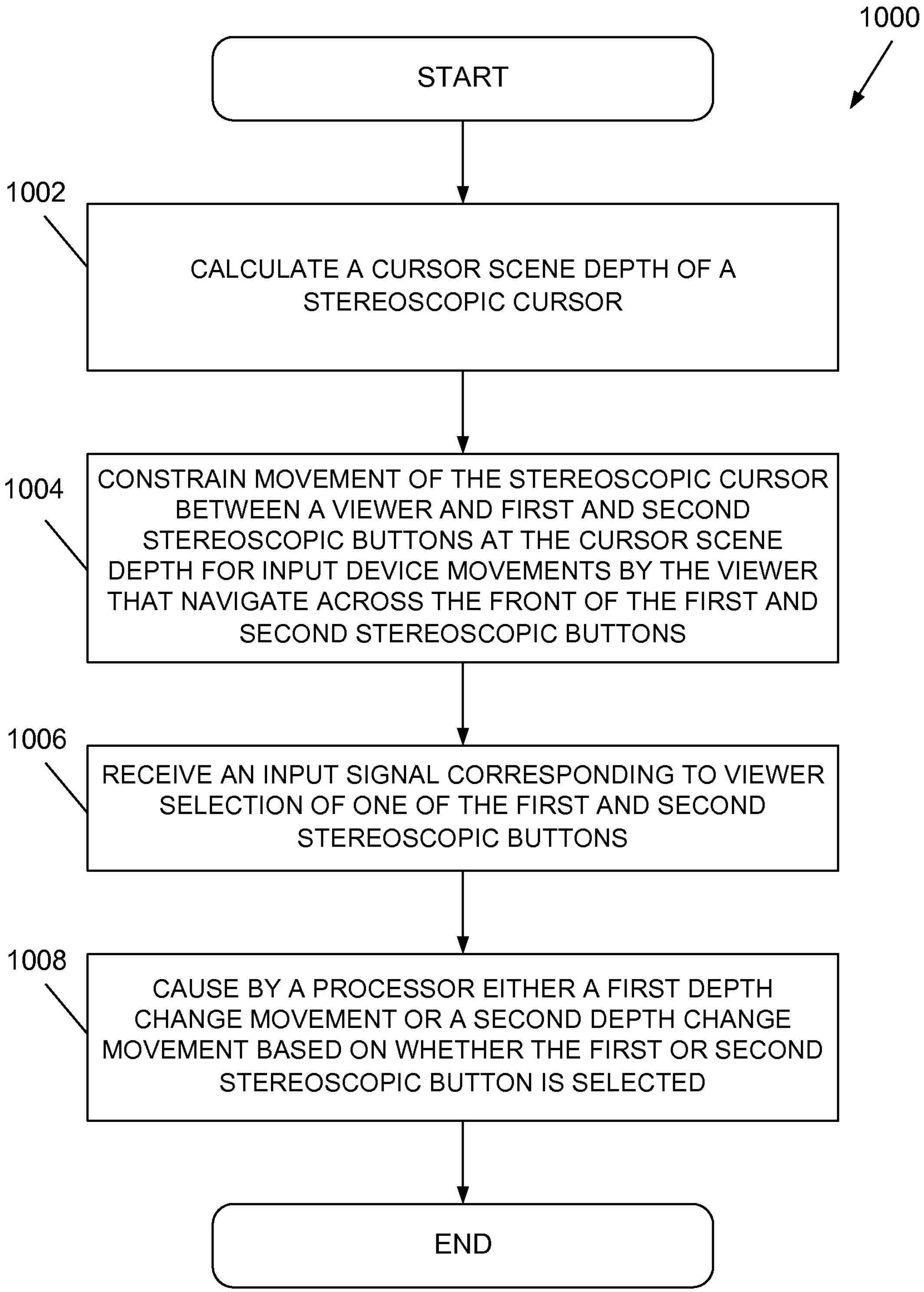
FIG. 10 is a flow diagram of another example embodiment of a stereoscopic cursor method.

In view of the foregoing disclosure, it should be appreciated that another embodiment of a stereoscopic cursor method 1000, implemented by the stereoscopic cursor system 700 and depicted in FIG. 10, comprises calculating a cursor scene depth of a stereoscopic cursor (1002). The stereoscopic cursor may be present in a stereoscopic user interface comprising first and second stereoscopic buttons, wherein the stereoscopic cursor is positioned between a viewer and the first and second stereoscopic buttons, the first stereoscopic button comprising a scene depth that is different than the second stereoscopic button. In other words, even in a stereoscopic user interface environment with two stereoscopic buttons, each may have a different scene depth giving rise to different depth change movements. The method 1000 further comprises constraining movement of the stereoscopic cursor between the viewer and the first and second stereoscopic buttons, the stereoscopic cursor movement constrained at the cursor scene depth for input device movements by the viewer that navigate across the front of the first and second stereoscopic buttons (1004). The method 1000 further comprises receiving an input signal corresponding to viewer selection of one of the first and second stereoscopic buttons (1006). The method 1000 further comprises causing by a processor either a first depth change movement or a second depth change movement based on whether the first or second stereoscopic button is selected (1008). For instance, responsive to receiving the input signal, if the first stereoscopic button is selected, a first depth change movement of the stereoscopic cursor occurs from one end of the cursor scene depth to a surface of the first stereoscopic button; otherwise if the second stereoscopic button is selected, a second depth change movement of the stereoscopic cursor occurs from the one end of the cursor scene depth to a surface of the second stereoscopic button.

Any process descriptions or blocks in flow diagrams should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, and/or with one or more functions omitted in some embodiments, depending on the functionality involved, as would be understood by those reasonably skilled in the art of the present disclosure. Also, though certain architectures are illustrated in the present disclosure, it should be appreciated that the methods described herein are not necessarily limited to the disclosed architectures.

In addition, though various delineations in software logic have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of stereoscopic cursor systems, it should be understood that not every embodiment necessarily provides every benefit/advantage.

In addition, the scope of certain embodiments of the present disclosure includes embodying the functionality of certain embodiments of a stereoscopic cursor system 700 in logic embodied in hardware and/or software-configured mediums. For instance, though described in software configured mediums, it should be appreciated that one or more of the stereoscopic cursor system and method functionality described herein may be implemented in hardware or a combination of both hardware and software.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A stereoscopic cursor method, the method comprising:

calculating a cursor scene depth of a stereoscopic cursor for a stereoscopic user interface comprising plural stereoscopic buttons, wherein the stereoscopic cursor is positioned between a viewer and the plural stereoscopic buttons;

constraining movement of the stereoscopic cursor between the viewer and the plural stereoscopic buttons at the cursor scene depth for input device movements by the viewer that navigate across the front of the plural stereoscopic buttons;

receiving an input signal corresponding to viewer selection of one of the plural stereoscopic buttons; and responsive to receiving the input signal, causing by a processor movement of the stereoscopic cursor from one end of the cursor scene depth to the one of the plural stereoscopic buttons in a direction coincident with the cursor scene depth.

2. The method of claim 1, wherein causing movement of the stereoscopic cursor comprises presenting on a display screen an animation of the stereoscopic cursor movement.

3. The method of claim 2, wherein causing movement of the stereoscopic cursor further comprises presenting on the display screen a press-button animation, wherein the press-button animation comprises a visual representation of the stereoscopic cursor compressing the one of the plural stereoscopic buttons.

4. The method of claim 3, further comprising returning the stereoscopic cursor to the cursor scene depth and the one of the plural stereoscopic buttons to its default depth responsive to completion of the press-button animation.

5. The method of claim 2, wherein the press-button animation changes an appearance of the stereoscopic cursor, the one of the plural stereoscopic buttons, or a combination of both.

6. The method of claim 1, wherein the movement of the stereoscopic cursor from the one end of the cursor scene depth to the one of the plural stereoscopic buttons is smooth.

7. The method of claim 1, wherein the constrained movement of the stereoscopic cursor at the cursor scene depth is different than the movement of the stereoscopic cursor from the one end of the cursor scene depth to the one of the plural stereoscopic buttons.

8. The method of claim 1, wherein calculating the cursor scene depth comprises:
- comparing a scene depth for each of the plural stereoscopic buttons;
- selecting a button of the plural stereoscopic buttons that is closest to the viewer; and
- adding a predetermined value to the scene depth of the selected button that is closest to the viewer to obtain the cursor scene depth, the predetermined value comprising a value greater than or equal to zero.

9. The method of claim 1, wherein receiving the input signal is based on either a click event, touch event, or gesture event.

10. The method of claim 1, wherein causing movement of the stereoscopic cursor comprises:
- determining a scene depth of the one of the plural stereoscopic buttons;
- determining a difference between the stereoscopic cursor scene depth and the button scene depth; and
- applying a scene depth change according to the difference.

11. A stereoscopic cursor method, the method comprising:
- calculating a cursor scene depth of a stereoscopic cursor for a stereoscopic user interface comprising plural stereoscopic buttons, wherein the stereoscopic cursor is positioned between a viewer and the plural stereoscopic buttons;
- receiving an input signal corresponding to viewer selection of either a first of the plural stereoscopic buttons or a second of the plural stereoscopic buttons;
- responsive to the viewer selecting the first of the plural stereoscopic buttons, causing by a processor a first depth change movement of the stereoscopic cursor from one end of the cursor scene depth to a first surface of the first of the plural stereoscopic buttons; and
- responsive to the viewer selecting the second of the plural stereoscopic buttons, causing by the processor a second depth change movement of the stereoscopic cursor from the one end of the cursor scene depth to a second surface of the second of the plural stereoscopic buttons, the first depth change being different than the second depth change.

12. The method of claim 11, wherein causing the first and second depth change movements further comprises presenting on a display screen an animation of the stereoscopic cursor moving according to the first and second depth change movements, respectively.

13. The method of claim 12, wherein causing the first and second depth change movements further comprises presenting on the display screen a respective press-button animation, wherein the press-button animation comprises a visual representation of the stereoscopic cursor compressing the first and the second of the plural stereoscopic buttons, respectively.

14. The method of claim 13, further comprising returning the stereoscopic cursor to the cursor scene depth and the selected one of the first and second of the plural stereoscopic buttons to its default depth responsive to completion of the press-button animation.

15. The method of claim 12, wherein the press-button animation changes an appearance of the stereoscopic cursor, the selected first or second of the plural stereoscopic buttons, or a combination of both.

16. The method of claim 11, wherein the first and second depth change movements are smooth.

17. The method of claim 11, further comprising constraining movement of the stereoscopic cursor at the cursor scene depth for movement of the stereoscopic cursor along the plural stereoscopic buttons in a direction different than the direction of selection.

18. The method of claim 11, wherein calculating the cursor scene depth comprises:
- comparing a scene depth for each of the plural stereoscopic buttons;
- selecting a button of the plural stereoscopic buttons that is closest to the viewer; and
- adding a predetermined value to the scene depth of the selected button that is closest to the viewer to obtain the cursor scene depth.

19. The method of claim 11, wherein causing either the first depth change movement or the second depth change movement comprises:
- determining a scene depth of the first or second of the plural stereoscopic buttons;
- determining a difference between the stereoscopic cursor scene depth and the first or second button scene depth; and
- applying a first or second scene depth change according to the respective difference.

20. A stereoscopic cursor method, the method comprising:
- calculating a cursor scene depth of a stereoscopic cursor for a stereoscopic user interface comprising first and second stereoscopic buttons, wherein the stereoscopic cursor is positioned between a viewer and the first and second stereoscopic buttons, the first stereoscopic button comprising a scene depth that is different than the second stereoscopic button;
- constraining movement of the stereoscopic cursor between the viewer and the first and second stereoscopic buttons at the cursor scene depth for input device movements by the viewer that navigate across the front of the first and second stereoscopic buttons;
- receiving an input signal corresponding to viewer selection of one of the first and second stereoscopic buttons; and
- responsive to receiving the input signal and responsive to the first stereoscopic button being selected, causing by a processor a first depth change movement of the stereoscopic cursor from one end of the cursor scene depth to a surface of the first stereoscopic button, otherwise causing by the processor a second depth change movement of the stereoscopic cursor from the one end of the cursor scene depth to a surface of the second stereoscopic button.

21. A stereoscopic cursor system, the system comprising:
- a memory comprising logic; and
- a processor configured by the logic to:
  - calculate a cursor scene depth of a stereoscopic cursor for a stereoscopic user interface comprising plural stereoscopic buttons, wherein the stereoscopic cursor is positioned between a viewer and the plural stereoscopic buttons;
  - constrain movement of the stereoscopic cursor between the viewer and the plural stereoscopic buttons at the cursor scene depth for input device movements by the viewer that navigate across the front of the plural stereoscopic buttons;

receive an input signal corresponding to viewer selection of one of the plural stereoscopic buttons; and responsive to receiving the input signal, cause movement of the stereoscopic cursor from one end of the cursor scene depth to the one of the plural stereoscopic buttons in a direction coincident with the cursor scene depth.

* * * * *